No. 866,978. PATENTED SEPT. 24, 1907.
G. W. SWIFT, Jr.
ENVELOP MACHINE.
APPLICATION FILED JAN. 27, 1906. RENEWED APR. 11, 1907.
6 SHEETS—SHEET 1.
FIG. I.
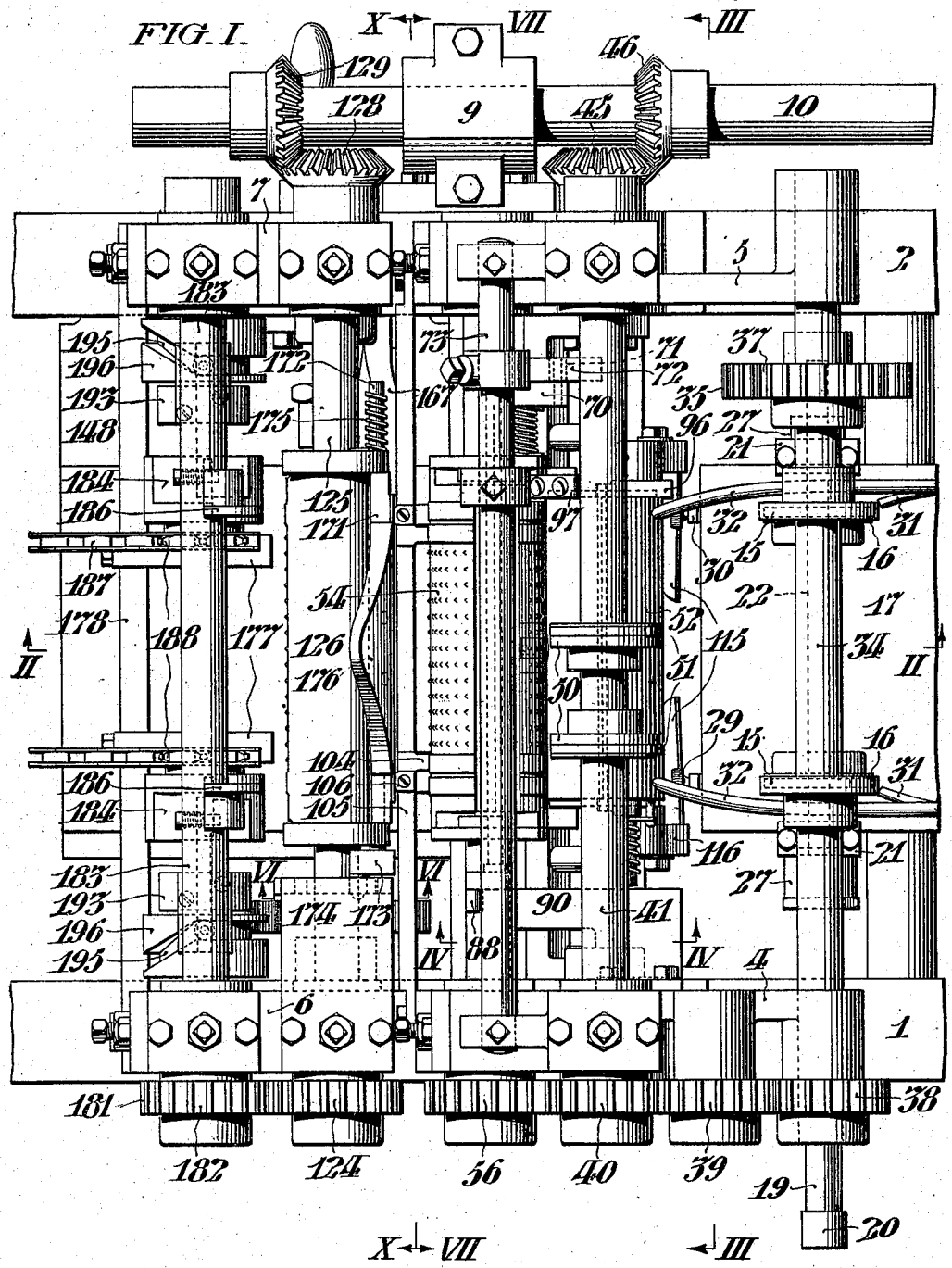
WITNESSES:
Clifton C. Hallowell
John C. Bergner
INVENTOR:
GEORGE W. SWIFT Jr.,
by Paige, Paul & Haley
Attys.

No. 866,978. PATENTED SEPT. 24, 1907.
G. W. SWIFT, Jr.
ENVELOP MACHINE.
APPLICATION FILED JAN. 27, 1906. RENEWED APR. 11, 1907.
6 SHEETS—SHEET 2.
FIG. II.
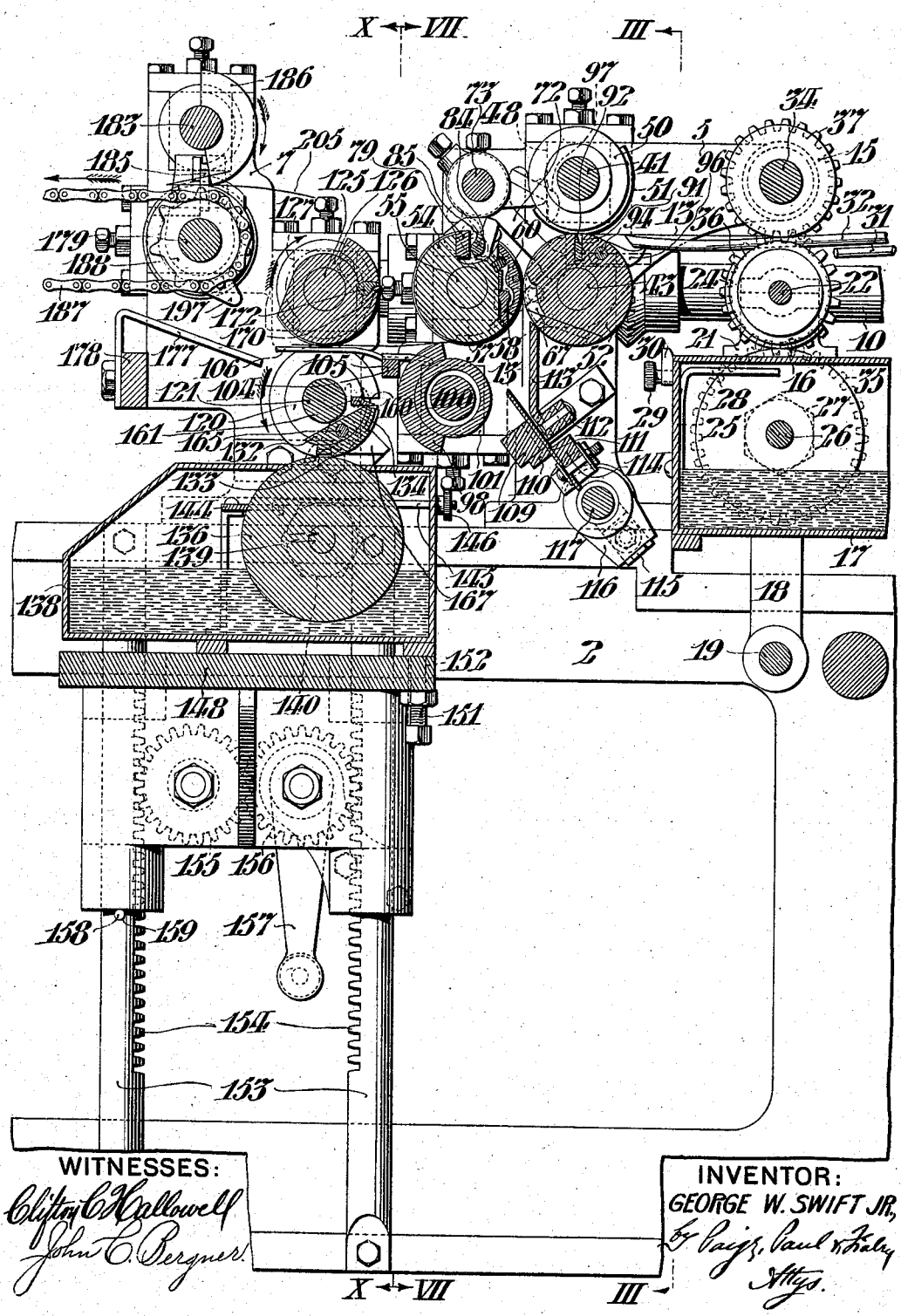
WITNESSES:
INVENTOR:
GEORGE W. SWIFT JR, No. 866,978. PATENTED SEPT. 24, 1907.
G. W. SWIFT, JR.
ENVELOP MACHINE.
APPLICATION FILED JAN. 27, 1906. RENEWED APR. 11, 1907.
6 SHEETS—SHEET 3.
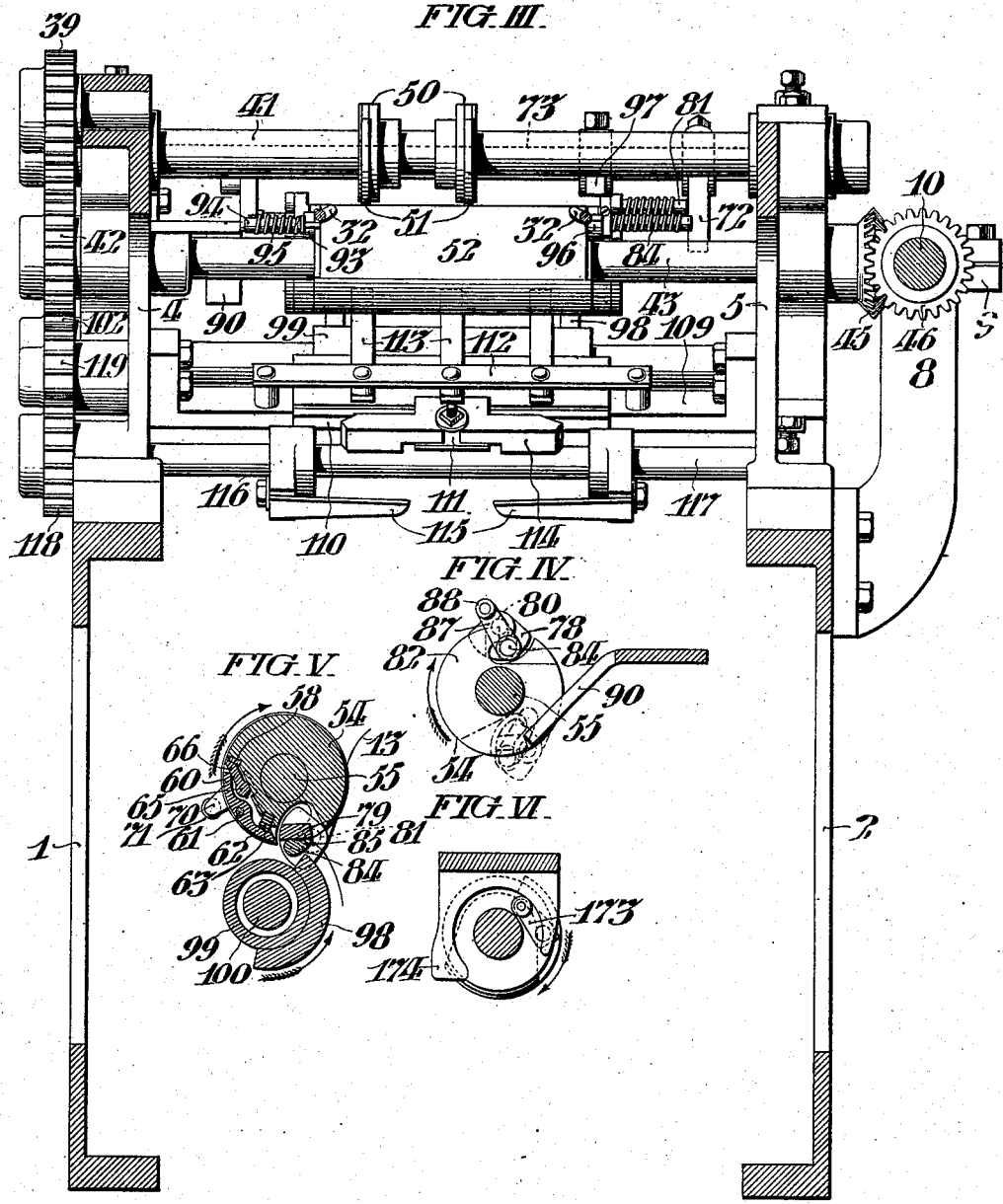

No. 866,978. PATENTED SEPT. 24, 1907.
G. W. SWIFT, Jr.
ENVELOP MACHINE.
APPLICATION FILED JAN. 27, 1906. RENEWED APR. 11, 1907.
6 SHEETS—SHEET 4.
FIG. VII.
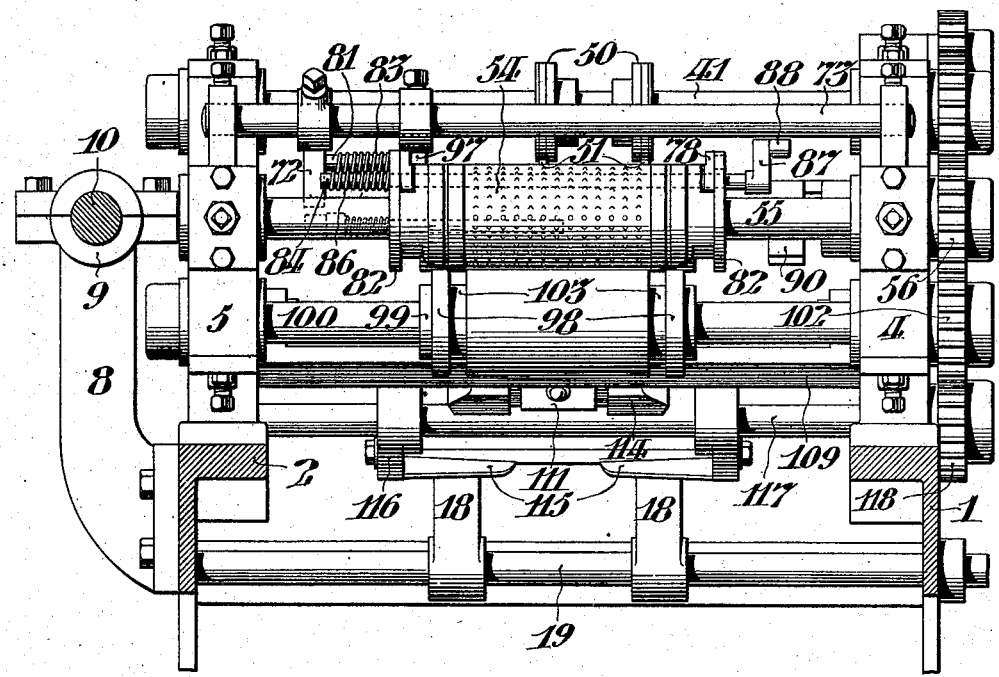
FIG. VIII.
FIG. IX.
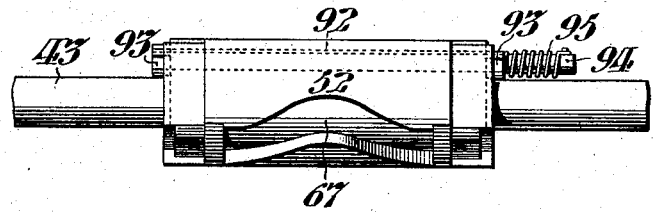
WITNESSES:
INVENTOR:
GEORGE W. SWIFT JR., No. 866,978. PATENTED SEPT. 24, 1907.
G. W. SWIFT, Jr.
ENVELOP MACHINE.
APPLICATION FILED JAN. 27, 1906. RENEWED APR. 11, 1907.
6 SHEETS—SHEET 5.
FIG. X.
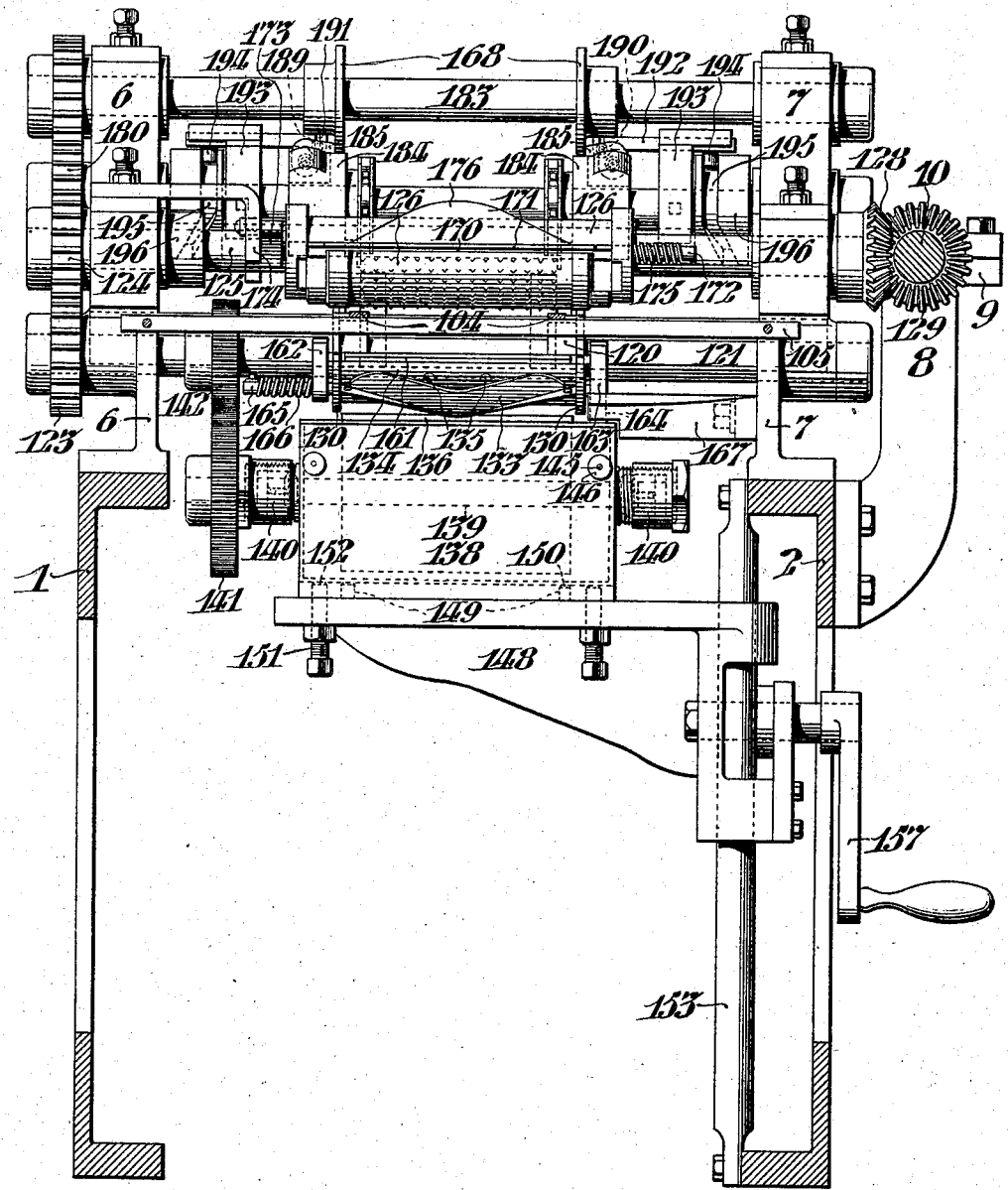
WITNESSES:
INVENTOR:
GEORGE W. SWIFT JR., No. 866,978. PATENTED SEPT. 24, 1907.
G. W. SWIFT, Jr.
ENVELOP MACHINE.
APPLICATION FILED JAN. 27, 1906. RENEWED APR. 11, 1907.
6 SHEETS—SHEET 6.
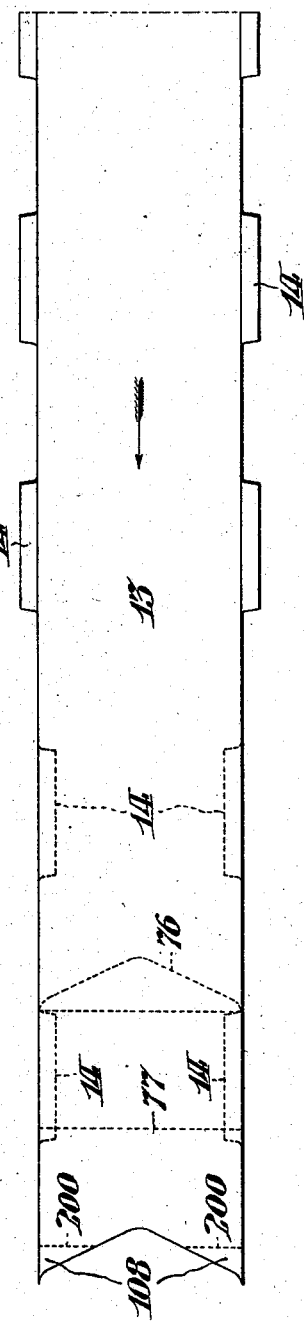
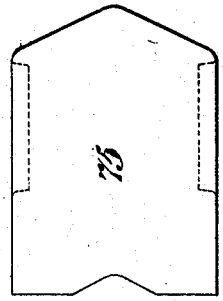
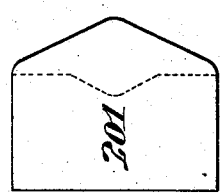
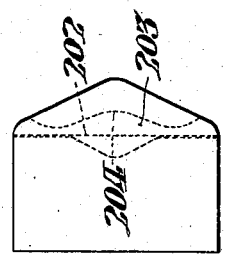
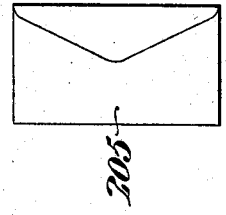
WITNESSES:
INVENTOR:
GEORGE W. SWIFT JR.,

UNITED STATES PATENT OFFICE.

GEORGE W. SWIFT, JR., OF BORDENTOWN, NEW JERSEY.

ENVELOP-MACHINE.

No. 866,978.  Specification of Letters Patent.  Patented Sept. 24, 1907.

Original application filed March 17, 1905, Serial No. 250,513. Divided and this application filed January 27, 1906, Serial No. 298,096. Renewed April 11, 1907, Serial No. 367,589.

*To all whom it may concern:*

Be it known that I, GEORGE W. SWIFT, Jr., of Bordentown, in the State of New Jersey, have invented certain new and useful Improvements in Envelop-Machines, whereof the following is a specification, reference being had to the accompanying drawings.

This application is a division of my application Serial Number 250,513, filed March 17th, 1905, and my improvements relate to machines for making envelops, comprising mechanism for shaping and severing blanks from a continuous web of paper, and mechanism for folding said blanks.

It is the object of my invention to provide a machine into which a web of paper may be continuously progressed, paste deposited in selected regions thereon, and blanks severed therefrom and folded to form envelops.

The form of my invention hereinafter described comprises web feeding disks, arranged to deposit paste in selected regions; creasing, cutting, and severing rollers; a rotary shearing mechanism arranged to trim the web transversely; folding mechanism; flap pasting rollers; and mechanism arranged to discharge the finished product.

Although I have described my invention as conveniently adapted to machines for making envelops; it is to be understood that it may be employed with equal advantage in other machines wherein a web is to be severed.

My invention includes the various novel features of construction and arrangement hereinafter more definitely specified and claimed.

In the accompanying drawings, Figure I, is a fragmentary plan view of a portion of an envelop machine, conveniently comprising my invention. Fig. II, is a central vertical longitudinal section taken on the line II, II, Fig. I. Fig. III, is a transverse vertical section taken on the line III, III, in Figs. I, and II. Fig. IV, is a fragmentary vertical sectional view taken on the line IV, IV, in Fig. I, showing the severing roller and its operating cam. Fig. V, is a sectional view of the severing roller taken on the same plane as Fig. II, but showing it rotated to another position. Fig. VI, is a fragmentary vertical sectional view taken on the line VI, VI, in Fig. I. Fig. VII, is a transverse vertical sectional view taken on the line VII, VII, in Figs. I, and II. Fig. VIII, is an elevational view looking toward the left in Fig. II, showing the cutting roller, which is arranged to sever the web transversely. Fig. IX, is an elevational view looking toward the right in Fig. II, showing the roller which is arranged to coöperate with the cutting roller shown in Fig. VIII. Fig. X, is a transverse vertical sectional view taken on the line X, X, in Figs. I, and II. Fig. XI, is a plan view of the web showing the successive steps in the manipulation thereof during its progression through the machine in the direction of the arrow indicated thereon. Fig. XII, is a plan view of one of the detached blanks. Fig. XIII, is a plan view of an envelop before having its flap pasted. Fig. XIV, is a plan view of an envelop with its flap pasted. Fig. XV, is an inverted plan view of a completed envelop.

In said drawings,—the frame comprises the side rails 1, and 2, which support the housings 4, 5, 6, and 7, comprising suitable bearings for the rotating members; and the rail 2, also supports the bracket 8, comprising the bearing 9, for the driving shaft 10.

The envelop web 13, is arranged to be fed into the envelop forming mechanism by the disks 15, and 16, of the edge pasting mechanism, which comprises the paste receptacle 17, supported for vertical movement by the levers 18, on the shaft 19, which is journaled in suitable bearings in the side rails 1, and 2, and provided with the controlling handle 20. Upon said paste receptacle 17, the bearings 21, are mounted, and carry the shaft 22, on which the paste depositing disks 16, are secured. Said disks 16, have resilient paste depositing segments 24, arranged to encounter the paste distributing disks 25, which are carried within the receptacle 17, by the shaft 26, journaled in the stuffing boxes 27.

The amount of paste carried by the distributing disks 25, to the depositing segments 24, may be varied by adjustment of the scrapers 28, which are secured within the receptacle 17, and arranged to bear against said disks 25, with any degree of frictional contact, controlled by the thumb screws 29, which are in threaded engagement with the wall of the receptacle and secured by the jam nuts 30.

As the web 13, progresses toward the paste depositing disks 16, its edge flaps 14, are turned inward against the under side of the web 13, by the coöperation of the guide wires 31, and 32. Said flaps 14, are laid flat upon the under side of the web as it passes between said paste depositing disks 16, and the coöperating feeding disks 15. Said disks 15, are carried by the shaft 34, which is journaled in the housings 4, and 5.

The shaft 26, is provided with the gear 35, arranged to mesh with the gear 36, on the shaft 22, which in turn is arranged to mesh with the gear 37, on the shaft 34. Said shaft 34, is also provided with the gear 38, which is arranged to mesh with the idler 39, meshing with the gear 40, on the shaft 41. Said gear 40, is arranged to mesh with the gear 42, on the shaft 43, which is provided with the miter gear 45, arranged to mesh with the miter gear 46, on the driving shaft 10. The shaft 41, is journaled in the adjustable bearing blocks 48, in the housings 4, and 5, and carries the disks 50, having the resilient segments 51, between which and the creasing roller 52, the web 13, is engaged and its progression is assisted after each blank is severed, and when the disks 15, and 16, are not engaging said web, as shown in Fig. II. Said web 13, is turned from its horizontal position partly around the creasing roller 52, passing between it and the severing roller 54, in a vertical direction to the shearing mechanism, which will be hereinafter described.

The roller 54, which is carried by the shaft 55, having the gear 56, arranged to mesh with the gear 42, is journaled in the adjustable bearing blocks 57, in the housings 4, and 5, and is provided with the cutting blade 58, arranged to indent the web 13, transversely against the roller 52, but not cut it entirely through. By such arrangement of said blade, its cutting edge is preserved by reason of its not coming into direct contact with the opposed roller 52. Said roller 54, carries the severing mechanism which comprises the winged lever 60, pivoted at 61, (see Fig. V,) and having the tang 62, engaged by the spiral spring 63, arranged to normally retain said wings so that their outer surface will be flush with the periphery of said roller.

The winged lever 60, is arranged to be actuated by the shaft 65, which is journaled in said roller 54, and provided at one end with the finger 56, arranged to press said wings of said lever 60, outward, into the recess 67, in the roller 52; and at the other end with the cam lever 70, having the roller 71, arranged to engage the stationary cam 72, which is secured to the stationary rod 73, supported in the housings 4, and 5, to rock said shaft 65. The outward movement of the wings 60, severs the blank 75, from the web 13, on the indented line indicated by the dotted line 76, in Fig. XI, made by the cutting blade 58.

The severing roller 54, carries a pivoted gripping frame which comprises the end pieces 78, connected by the cross bar 79, and provided with trunnions 80, and 81, journaled in the flanges 82, of said roller 54. The trunnion 81, is encircled by the coil spring 83, arranged to normally retain said pivoted frame in the position shown in Figs. II, and IV.

The shaft 84, having the gripping blade 85, arranged to coöperate with the cross bar 79, in gripping the creased web 13, is mounted for oscillation in the end pieces 78, of the gripping frame, and is encircled by the coiled spring 86, arranged to normally separate said blade 85, from the cross bar 79, as best shown in Fig. II. Said shaft 84, is also provided with the cam arm 87, having the roller 88, arranged to engage the stationary cam 90, best shown in Fig. IV, which rocks the blade 85, against the cross bar 79, to grip the web 13. The further rotation of the roller 54, causes the entire pivoted frame to turn on its trunnions 80, and 81, as shown in full lines in Fig. V, and in dot and dash lines in Fig. IV, thereby holding the creased web 13, in a tangential position with respect to said roller 54, to avoid kinking said web.

The roller 52, is provided with a slot 91, in which is set the creasing blade 92, arranged to be reciprocated radially by its engagement with the bifurcated levers 93, on the rock shaft 94, which is mounted for oscillation in said roller 52, and arranged to be normally rocked by the coil spring 95, to retract said blade 92; and by the engagement of the cam arm 96, with the cam 97, which latter is secured on the stationary rod 73, said shaft 94, is arranged to be rocked to project said blade 92, and thereby press the web 13, between the cross bar 79, and the gripping blade 85, to be gripped thereby and carried to a point slightly beyond that shown in Fig. V, where said blade 85, releases its grip on the web 13, which is then caught between the roller 54, and the sector 98, of the roller 99. Said roller 99, is carried by the shaft 100, which is journaled in the bearing blocks 101, adjustably mounted in the housings 4, and 5, and which is provided with the gear 102, arranged to mesh with the gear 56, on the shaft 55.

The sector 98, is conveniently provided with grooves 103, arranged to receive the horizontal guides 104, on the cross piece 105, which is secured to the housings 4, and 5, and which carries the horizontal guides 106, extending in the opposite direction to that of the guides 104, arranged to guide the envelop blank 75, in its passage from the severing roller to the flap pasting and creasing rollers to be hereinafter described.

The shearing mechanism is arranged to shear the corners 108, from the web 13, and comprises the supporting bar 109, which extends between the housings 4, and 5, and supports the stationary blade 110, the obliquely disposed guide plate 111, and the guide frame 112, to which the vertical guide pieces 113, are secured. To said guide plate 111, is secured the adjustable stop block 114, which is arranged to stop the web 13, in such a position that the desired portion of the corners 108, will overhang the cutting edge of the blade 110, to be sheared by the rotary blades 115, which are adjustably secured to the cranks 116, carried by the shaft 117, which is journaled in suitable bearings in the feet of the housings 4, and 5, and which is provided with the gear 118, arranged to mesh with the idler 119, which meshes with the gear 102, of the shaft 100.

The flap pasting and creasing roller 120, is carried by the shaft 121, which is journaled in suitable bearings in the housings 6, and 7, and which is provided with the gear 123, arranged to mesh with the gear 124, on the shaft 125. Said shaft 125, carries the gripping roller 126, and is journaled in the bearing blocks 127, which are adjustably mounted in said housings 6, and 7. Said shaft 125, is provided with the miter gear 128, arranged to mesh with the miter gear 129, on the driving shaft 10.

The roller 120, comprises the flange 130, joined by the segmental cross piece 132, to which the resilient paste depositing type 133, is conveniently secured by the frame 134, which is retained by the screws 135. The type 133, is arranged to contact with the paste distributing roller 136, which is mounted for rotation in the paste receptacle 138, and which has its shaft 139, journaled in the stuffing boxes 140. Said shaft 139, is provided with the gear 141, arranged to mesh with the gear 142, on the shaft 121.

The amount of paste carried by the distributing roller 136, may be regulated by the scraper plate 144, suitably mounted in said receptacle and arranged to engage said roller 136, with any degree of frictional contact by adjustment of the links 145, extending through the wall of the receptacle in threaded engagement with the thumb screws 146. The receptacle 138, is supported on the elevator 148, having the dowel pins 149, arranged to enter recesses 150, in the bottom of said receptacle to prevent lateral movement, but is arranged to be adjusted vertically by the set screws 151, in threaded engagement with said elevator and extended into recesses 152, in the bottom of said receptacle.

The elevator 148, is arranged to withdraw the paste receptacle from action when the machine is stopped, and is conveniently supported on the vertical rack bars 153, which are secured to the side rail 2, and comprise rack teeth 154, arranged to be engaged by the gears 155, and 156, which also intermesh with each other, and which are carried by the elevator. The gear 156, is provided with a handle 157, by the rotation of which said elevator may be raised or lowered at will, and may be retained in its uppermost position by the pin 158, extending through the aperture 159, in the rack bar 153.

The flanges 130, of the roller 120, are provided with recesses 160, to receive the radially reciprocatory creasing blade 161, which projects beyond the sides of said flanges and is engaged by the bifurcated levers 162, and 163, the latter having the cam arm 164. Said levers 162, and 163, are secured to the rock shaft 165, which extends through the segmental cross piece 132, and which is encircled by the coiled spring 166, arranged to rock said shaft to normally press the blade 161, back into its recess 160.

The cam arm 164, is arranged to engage the stationary cam 167, which is secured to housing 7, to rock the blade 161, radially outward to crease the blank 75, and press said crease into the groove 170, in the gripping roller 126, in which groove the gripping blade 171, is arranged to oscillate, being carried by the rock shaft 172, which is mounted to rock in said roller.

The rock shaft 172, is provided with the cam arm 173, arranged to engage the stationary cam 174, to rock said shaft against the tension of its coil spring 175, to the position shown in Fig. II, to receive the flap crease of the blank 75. When said arm 173, is released by the cam 174, the spring 175, rocks the shaft 172, to oscillate the gripping blade 171, to grip said blank.

The further rotation of the rollers 120, and 126, progress the blank 75, so that the edge of its flap is presented between the paste depositing type 133, of the roller 120, and the platen 176, of the roller 126. As the formed envelop emerges from between the rollers 120, and 126, its bottom edge rides upon the guides 177, which are secured to the cross bar 178, supported by the housings 6, and 7. The shaft 179, journaled in the housings 6, and 7, is provided with the gear 180, arranged to mesh with the idler 181, meshing with the gear 123, and said gear 180, also meshes with the gear 182, on the shaft 183. Said shaft 179, carries the drums 184, which are provided with the gripping fingers 185, pivoted to oscillate on axes disposed at right angles to the axis of said drums, to grip the completed envelop as it leaves the flap pasting and creasing rollers, and to carry it to the position shown in Fig. II, where said gripping fingers release it, and the semicircular disks 186, on the shaft 183, engage its edges against said drums and deposit it upon the conveyer chains 187, which are carried by the sprockets 188, mounted on the drums 184.

The gripping fingers 185, are pivoted at 189, on the drums 184, and are provided with the projecting pins 190, engaged by the slots 191, in the slide bars 192, which latter are arranged to reciprocate in the cranks 193, carried by the shaft 179. Said slide bars 192, are provided with the rollers 194, arranged to traverse the cam grooves 195, in the stationary cams 196, which are secured to the housings 6, and 7. By the reciprocation of the slide bars 192, the gripping fingers 185, are oscillated to alternately engage and disengage the periphery of their respective drums, and thereby grip the envelop as it is presented between them.

The conveyer chain may be provided with lugs 197, at proper intervals to engage the envelops as they leave the drums 184, to insure their proper position on said chain.

During the operation of the machine all of the rollers are arranged to be continuously rotated in the direction of the arrows indicated upon the several views, and the web 13, is arranged to be continuously progressed thereby. The web 13, is drawn into engagement with the wires 31, and 32, which turn its flaps 14, under as shown in Fig. XI, flat upon the under side of the web, by the coöperation of the disks 15, and the paste depositing disks 16, which are arranged to deposit paste upon said turned under flaps. Said web 13, then passes partially around the creasing roller 52, and is creased as indicated by the dotted line 77, in Fig. XI, and said crease is pressed into the gripping frame, carried by the roller 54, and is gripped by the gripping blade 85, and carried around by said frame. The fish-tail shaped end of the web 13, passes vertically downward, and then turns obliquely into the shearing mechanism where the corners 108, are trimmed or sheared as indicated by the dotted lines 200, in Fig. XI. The web 13, is then indented by the blade 58, and the severing winged lever 60, operates to break said web in the indented line 76, as indicated in Fig. XI, and the blank 75, as shown in Fig. XII, is thus severed from the web 13, and is independently carried between the roller 54, and the segmental disks 98, which tightly press the pasted edges and seal the ends of the formed envelop 201, best shown in Fig. XIII. Said formed envelop passes between the rollers 120, and 126, and the creasing blade 161, creases the flap on the dotted line 202, as indicated in Fig. XIV, and presses said crease into the groove 170, where it is gripped by the blade 171. The flap 203, passes between the paste depositing type 133, and the platen 176, and paste is deposited on the flap as indicated at 204, in Fig. XIV. After the flap has been pasted, the completed envelop 205, as shown in Fig. XV, is carried by the roller 126, to the under side of the drums 184, where the fingers 185, grip its edges and carry it to the upper side of said drum, and deliver it to the conveyer chains 187, which are arranged to carry it from the machine to any desired place.

I do not desire to limit myself to the precise details of construction and arrangement herein set forth, as it is obvious that various modifications may be made therein without departing from the essential features of my invention.

I claim:—

1. In an envelop machine, the combination with means arranged to progress a paper web; of means arranged to form a line of indentations in said web without severing it; and, severing means independent of said indenting means arranged to break said web on the line of said indentations, by distorting it transversely with respect to its plane; and means operatively connecting said indenting means and said severing means to operate in the order named, substantially as set forth.

2. In an envelop machine, the combination with means arranged to progress a paper web; of a cutting blade arranged to indent said web without severing it; and, severing means arranged to break said web where indented by distorting it transversely with respect to its plane, substantially as set forth.

3. In an envelop machine, the combination with means arranged to progress a paper web; of means arranged to indent said web without severing it; and, a lever arranged to break and thereby sever said web where indented by distorting it transversely with respect to its plane, substantially as set forth.

4. In an envelop machine, the combination with means arranged to progress a paper web; of means arranged to indent said web without perforating it; a lever; and, wings on said lever arranged to break and thereby sever said web where indented, substantially as set forth.

5. In an envelop machine, the combination with means arranged to progress a paper web; of means arranged to indent one surface of said web; a lever; wings on said lever arranged to break and thereby sever said web where indented; a rock shaft arranged to actuate said lever; and, means arranged to rock said shaft, substantially as set forth.

6. In an envelop machine, the combination with means arranged to progress a paper web; of a severing roller carrying a cutting blade, arranged to indent one surface of said web; a winged lever arranged to break and thereby sever said web, where indented; a rock shaft arranged to shift said lever; and, means arranged to rock said shaft, substantially as set forth.

7. In an envelop machine, the combination with means arranged to progress a paper web; of a severing roller carrying a cutting blade, arranged to indent one surface of said web; a winged lever arranged to break said web where indented; a rock shaft having a finger distinct from, but arranged to shift said winged lever; a cam arm; and, a cam arranged to engage said cam arm and thereby rock said shaft, substantially as set forth.

8. In an envelop machine, the combination with means arranged to progress a paper web; of a severing roller; a creasing roller; a blade carried by said severing roller arranged to indent said web against said creasing roller without severing the web; a lever arranged to break and thereby sever said web where indented, by distorting it transversely with respect to its plane and, connecting means whereby the indenting blade and severing lever are actuated in the order named, substantially as set forth.

9. In an envelop machine, the combination with means arranged to progress a paper web; of a severing roller; a creasing roller; a blade carried by said severing roller arranged to indent said web against said creasing roller; a lever arranged to break said web where indented; means arranged to actuate said lever; and, means arranged to double and grip said web transversely and thereby draw it taut against said severing roller, substantially as set forth.

10. In an envelop machine, the combination with means arranged to progress a paper web; of means arranged to form a line of indentations in said web; means independent of said indenting means arranged to break said web on the line of said indentations; a pivoted gripping frame; and, a blade carried by said frame, arranged to grip said web at a predetermined distance from its broken end and thereby draw it taut against said severing roller, substantially as set forth.

11. In an envelop machine, the combination with means arranged to progress a paper web; of a severing roller carrying a cutting blade, arranged to indent said web; a winged lever arranged to break said web, where indented; a rock shaft arranged to shift said lever; means arranged to rock said shaft; a movable gripping frame carried by said severing roller; and, an oscillatory blade pivoted to said frame, arranged to grip said web at a predetermined distance from its broken end and thereby draw it taut against said roller, substantially as set forth.

12. In an envelop machine, the combination with means arranged to progress a paper web; of a severing roller carrying a cutting blade, arranged to indent said web; a winged lever arranged to break said web, where indented; a rock shaft arranged to shift said lever; means arranged to rock said shaft; a pivoted gripping frame mounted to oscillate in said severing roller; a blade pivoted in said frame, arranged to grip the web at a predetermined distance from its broken end, and thereby draw it taut around said severing roller; a spring arranged to normally maintain said blade open; and, means including a cam, rendered operative by the rotation of said severing roller to first rock said blade independently of its frame to engage said frame and thereby grip the web, and then rock said frame by the further movement of said blade, substantially as set forth.

13. In an envelop machine, the combination with means arranged to progress a paper web; of a severing roller carrying a cutting blade, arranged to indent said web; a winged lever arranged to break said web, where indented; a rock shaft arranged to shift said lever; means arranged to rock said shaft; a pivoted gripping frame mounted to oscillate in said severing roller; a blade pivoted in said frame; beans arranged to normally maintain said blade open; a creasing roller comprising a radially movable blade arranged to press said web into said gripping frame, at a predetermined distance from the broken end of said web; means comprising a cam, rendered operative by the rotation of said roller to first rock said blade independently of its frame, to engage said frame and thereby grip the web to draw it taut around said roller, and then rock said frame by the further movement of said blade, substantially as set forth.

14. In an envelop machine, the combination with means arranged to progress a paper web; of a severing roller carrying a cutting blade, arranged to indent said web; a winged lever arranged to break said web, where indented; a rock shaft arranged to shift said lever; means arranged to rock said shaft; a pivoted gripping frame mounted to oscillate on said severing roller; a blade pivoted in said frame; means arranged to normally maintain said blade open; a creasing roller comprising a radially movable blade, having a beveled edge arranged to press said web into said gripping frame at a predetermined distance from the broken end of said web; means comprising a cam, rendered operative by the rotation of said roller to first rock said blade independently of its frame to engage said frame and thereby grip the web to draw it taut against said roller and then rock said frame by its further movement; and, a shearing mechanism arranged to operate in definite sequence with said severing blade to trim the broken end of said web; said shearing mechanism being so related to said roller that the broken end of the web gravitates into said shearing mechanism, substantially as set forth.

15. In an envelop machine, the combination with means arranged to progress a paper web; of a severing roller carrying a cutting blade, arranged to indent said web; a winged lever arranged to break said web, where indented; a rock shaft arranged to shift said lever; means arranged to rock said shaft; gripping mechanism carried by said roller arranged to grip the web at a predetermined distance from its broken end, and thereby draw it taut against said roller; a rotary shearing mechanism arranged to trim the broken end of said web, and so related to said roller that the broken end of the web descends by gravity into said shearing mechanism, substantially as set forth.

16. In an envelop machine, the combination with means arranged to progress a paper web; of a severing roller carrying a cutting blade, arranged to indent said web; a winged lever arranged to break said web, where indented; a rock shaft arranged to shift said lever; means arranged to rock said shaft; a gripping mechanism carried by said roller arranged to grip the web, at a predetermined distance from its broken end and thereby draw it taut against said roller; sectors in coöperative relation with said severing roller, arranged to progress the web in definite relation to said severing roller and thereby maintain said web taut against said roller after it is released by said gripping mechanism, substantially as set forth.

17. In an envelop machine, the combination with means arranged to progress a paper web; of a severing roller carrying a cutting blade, arranged to indent said web; a winged lever arranged to break said web, where indented; a rock shaft arranged to shift said lever; means arranged to rock said shaft; gripping mechanism carried by said roller arranged to grip the web at a predetermined distance from its broken end and thereby draw it taut against said roller; a rotary shearing mechanism comprising a stationary blade; guides arranged to direct said web to gravitate across said blade; and rotary blades arranged to coöperate with said stationary blade to shear the broken end of said web, substantially as set forth.

18. In an envelop machine, the combination with means arranged to progress a paper web; of a severing roller carrying a cutting blade, arranged to indent said web; a winged lever arranged to break said web, where indented; a rock shaft arranged to shift said lever; means arranged to rock said shaft; gripping mechanism carried by said roller arranged to grip the web at a predetermined distance from its broken end and thereby draw it taut against said roller; a rotary shearing mechanism comprising a stationary blade; guides arranged to direct said web to gravitate across said blade; rotary blades arranged to coöperate with said stationary blade to shear the broken end of said web; and, an adjustable block arranged to stop the descent of the web and thereby determine the amount of web to be trimmed off, substantially as set forth.

In testimony whereof, I have hereunto signed my name, at Bordentown in the State of New Jersey this twenty-fifth day of January 1906.

GEORGE W. SWIFT, Jr.

Witnesses:
CLARA N. HUTCHINSON,
JOHN H. HUTCHINSON.

It is hereby certified that in Letters Patent No. 866,978, granted September 24, 1907, upon the application of George W. Swift, Jr., of Bordentown, New Jersey, for an improvement in "Envelop-Machines," an error appears in the printed specification requiring correction, as follows: In line 99, page 4, the word "beans" should read *means*; and that the said Letters Patent should be read with this correction therein that the same may conform to the record of the case in the Patent Office.

Signed and sealed this 22d day of October, A. D., 1907.

[SEAL.]

C. C. BILLINGS,
*Acting Commissioner of Patents.*